United States Patent Office.

HENRY PEMBERTON, OF ALLEGHENY CITY, PENNSYLVANIA.

Letters Patent No. 108,177, dated October 11, 1870.

IMPROVEMENT IN THE MANUFACTURE OF PAPER.

The Schedule referred to in these Letters Patent and making part of the same.

*To all whom it may concern:*

Be it known that I, HENRY PEMBERTON, of Allegheny City, State of Pennsylvania, have invented a new and useful Improvement in the Manufacture of Paper; and I do hereby declare the following to be a full, clear, and exact description of the same, which will enable others skilled in the art to which it appertains to practice my invention.

In the manufacture of paper, especially of printing-paper, there are consumed large quantities of hydrated sulphate of lime, in a peculiarly crystalline condition, in which the particles, when examined under the higher powers of a microscope, are resolved into extremely thin, long needles or prisms, and which, from their extreme length in comparison with their other diameters, especially fit them for interweaving among the fibers of the organic tissue, so as to form a true paper, and not merely a mixture, loosely entangled, and easily removed from the organic fibers, as is the case when clay and similar amorphous substances, or when coarse crystalline particles are used. This preparation of sulphate of lime has become, under various names, an important article of commerce, notwithstanding the high price that its mode of manufacture in the present manner requires.

The process as now practiced is as follows:

A dilute solution of muriate, or other soluble salt of lime, is decomposed with an equivalent quantity of dilute sulphuric acid, so that, owing to the stronger affinity the sulphuric acid has for the lime the muriatic acid is displaced from combination with the lime, and dissolves in the excess of water present, while the sulphate of lime formed, being but slightly soluble, precipitates from the solution as a flocculent powder, having the peculiar crystalline character above referred to. The objections to this process are the cost of the sulphuric acid, which, being itself a direct product of manufacture, and seldom if ever a secondary or waste product is necessarily expensive. This cost is further increased by the fact that the solubility of the sulphate of lime, (comparatively slight in pure water,) is very much greater when free muriatic acid is present, so that in practice, twenty to forty per cent. less sulphate is obtained, than theory would indicate, from the quantity of acid used, and thus, of course, causing a corresponding increase of price.

My invention consists in a mode of preparation of the above-described peculiar form of sulphate of lime, from waste or secondary products, whereby an article of equal beauty and purity, as well as of the required physical character, can be procured, at a greatly reduced cost from that of the process wherein sulphuric acid is directly used.

To enable others to understand my process, I now proceed to describe the same at length.

I take a solution of muriate of lime, or chloride of calcium, ($CaCl$,) as it is more correctly called; this solution may be prepared, either, as is generally practiced, by treating the waste dilute muriatic acid from the condensers of the furnaces wherein common salt is decomposed by sulphuric acid, and saturating the same with lime or limestone, or, what I prefer to do, by making use of the mother-waters, or bittern resulting from the manufacture of common salt, from the brine, from salt wells, or other sources, and which consists, essentially, of the chloride of calcium, chloride of magnesium, chloride of sodium, with small quantities of bromides, of the above and other bases. This solution I either concentrate by evaporation, so as to reduce it to a small bulk, convenient for transportation, or, if the process is to be carried on at or near the salt works, I dilute it at once to the density of about 15° Baumé.

I now prepare, in another vessel, a solution of the impure sulphate of soda, resulting from the decomposition (in iron cylinders, usually,) of nitrate of soda, or of chloride of sodium by sulphuric acid, from the preparation of nitric and sulphuric acids, which acids, being consumed in very large quantities in the arts, are made in very many chemical factories. This impure sulphate of soda, technically known under the names of "salt cake" and "nitrate cake," contains a large amount of free acid, much undecomposed salt, or nitrate of soda, and a variable, but always considerable quantity of iron, in the state of a salt of iron. This sulphate commands, usually, a very low price, generally only about one-fifth to one-eighth of that of the acid actually contained therein, and, as a waste or secondary product, from the above-named manufactures, is of slow and difficult sale. I dissolve this salt cake in such a quantity of water as will form a solution of from 10° to 20° Baumé. I leave this to settle, so as to get rid of a portion of the insoluble impurities. I then run the partially-clear liquid through filters, made of close muslin or woolen cloth, so as to remove all insoluble matter, and obtain a clear solution, usually of a greenish or reddish color, but perfectly bright and transparent. In this solution is contained all the iron and other soluble impurities, but I have found that their presence is not injurious to the process, provided that a sufficient quantity of free acid is present, to hold the same in solution, and to neutralize the frequently alkaline reaction of the chloride of calcium solution. Should, however, the solution not be sufficiently acid, then I either add some free sulphuric or muriatic acid, or, in place thereof, previously calcine the impure sulphate of soda, until all the acid, in combination with the oxide of iron, is driven off, and the oxide is left insoluble, when the solution will contain no iron on dissolving the salt cake.

As the above calcination is expensive and wastes the acid that would otherwise take part in the precipitation, I prefer the former plan of operation. I now mix, gradually, the above-named solutions of chloride of calcium and of impure sulphate of soda, and stir well; then leave to settle. The clear liquid being decanted may be neutralized with lime, and boiled down for the salt it contains, or thrown away, as circumstances may render expedient. The precipitate being thrown upon filters, of muslin or other fabric, I now wash until the mass becomes perfectly white, and the washings show no longer the presence of acid, iron, or other injurious substances, when the mass is removed, pressed, and packed for market.

It is evident that the above-described solution of chloride of calcium or bittern from the brine or salt springs may be precipitated with sulphuric acid, and thus effect a considerable economy over the use of the solution of chloride of calcium artificially prepared from limestone and muriatic acid.

Under certain circumstances, I make use of this last-described plan, but prefer to employ the impure sulphate, as being more economical.

What I claim, and desire to secure by Letters Patent of the United States, is—

The preparation of precipitated sulphate of lime from the secondary and impure products of other manufactures, substantially as described.

H. PEMBERTON.

Witnesses:
J. B. DUFF,
J. W. DECKERT.